July 25, 1944. F. A. DE LISLE Re. 22,520

FILTER

Original Filed March 13, 1939 7 Sheets-Sheet 1

INVENTOR.
F. A. De Lisle
BY
Morgan, Finnegan & Durham
ATTORNEYS

July 25, 1944. F. A. DE LISLE Re. 22,520
FILTER
Original Filed March 13, 1939 7 Sheets-Sheet 2
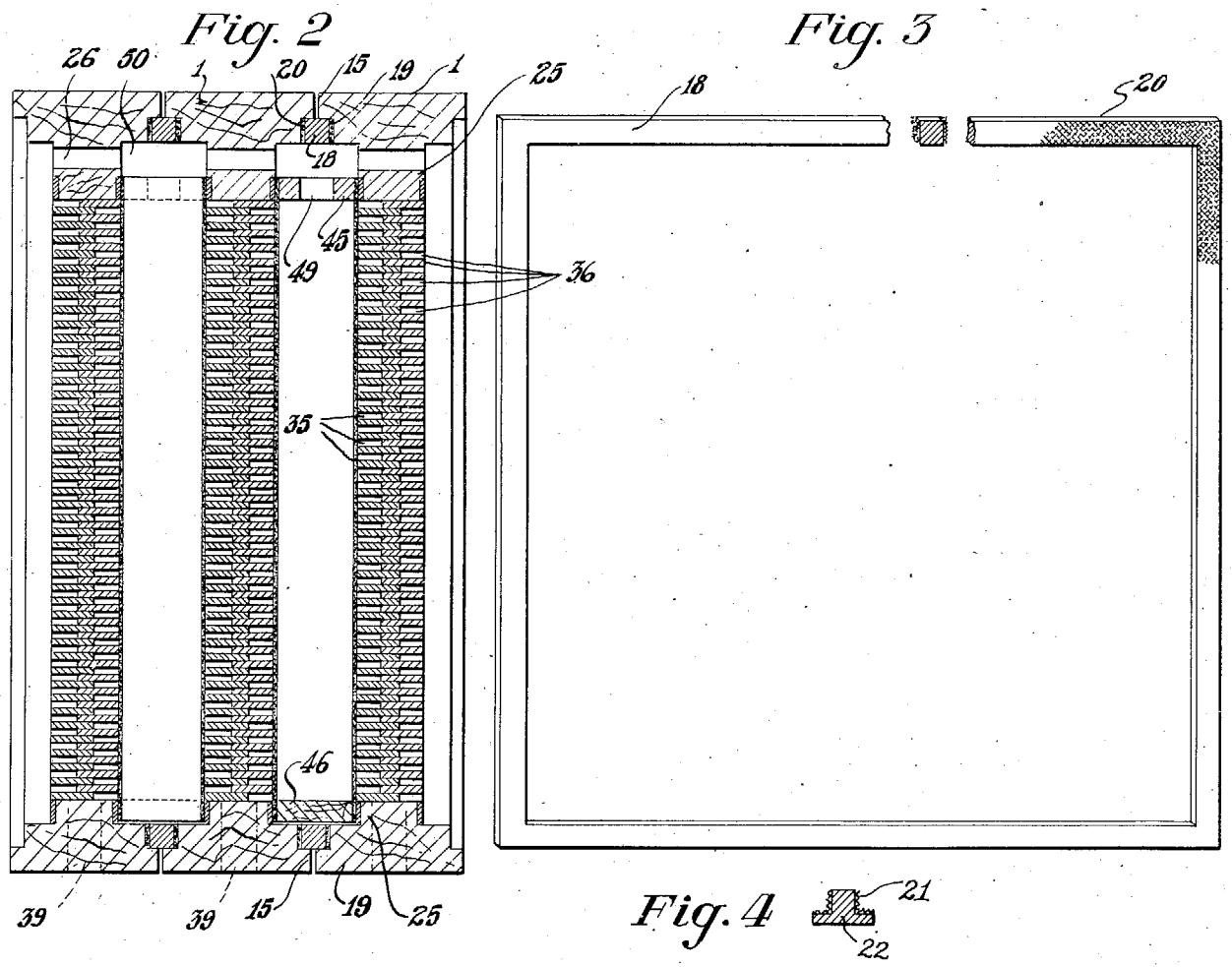
INVENTOR.
F. A. De Lisle
BY
Morgan, Finnegan & Durham
ATTORNEYS July 25, 1944. F. A. DE LISLE Re. 22,520

FILTER

Original Filed March 13, 1939 7 Sheets-Sheet 3

INVENTOR.
F. A. De Lisle
BY
Morgan, Finnegan & Durham
ATTORNEYS

July 25, 1944. F. A. DE LISLE Re. 22,520
FILTER
Original Filed March 13, 1939 7 Sheets-Sheet 4
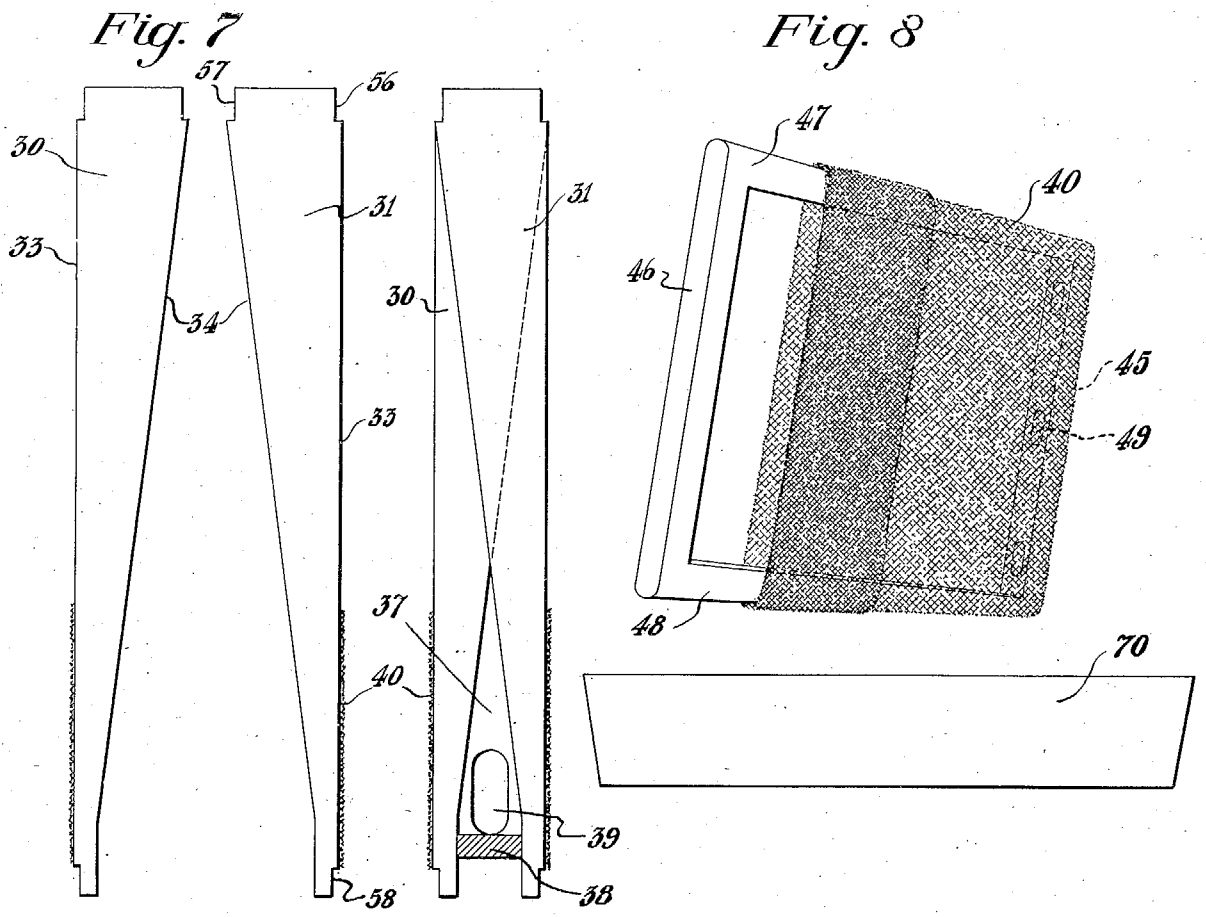
INVENTOR.
F. A. De Lisle
BY
Morgan, Finnegan & Durham
ATTORNEYS July 25, 1944. F. A. DE LISLE Re. 22,520

FILTER

Original Filed March 13, 1939 7 Sheets-Sheet 5

INVENTOR.
F. A. De Lisle
BY
Morgan, Finnegan & Durham
ATTORNEYS

FILTER

Original Filed March 13, 1939 7 Sheets-Sheet 6

F. A. De Lisle INVENTOR.

BY Morgan, Finnegan & Durham ATTORNEYS

July 25, 1944. F. A. DE LISLE Re. 22,520

FILTER

Original Filed March 13, 1939 7 Sheets-Sheet 7

INVENTOR.
F. A. De Lisle
BY
Morgan, Finnegan & Durham
ATTORNEYS

Reissued July 25, 1944 Re. 22,520

UNITED STATES PATENT OFFICE 22,520

FILTER

Francis A. De Lisle, Albion, Ind., assignor to George B. Finnegan, Jr., trustee, Mountain Lakes, N. J.

Original No. 2,293,120, dated August 18, 1942, Serial No. 261,425, March 13, 1939. Application for reissue May 20, 1943, Serial No. 487,788

13 Claims. (Cl. 210—188)

The invention relates to improvements in the art of filtration and more particularly to a novel and improved method of operating pressure type filtering systems and to improvements in the filter press mechanisms.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 2 is an enlarged transverse horizontal section of three units of the filter press showing the plates and filter media in position;

Fig. 3 is a perspective view of gasket frame with parts broken away to show the cross-sectional construction;

Fig. 4 is a cross-section of a modified form of gasket;

Fig. 7 shows in elevation two grid-forming strips in disassembled and assembled positions;

Fig. 8 is a perspective view of a filter cloth rack with filter cloth thereon partly inverted for removal;

Figure 1:
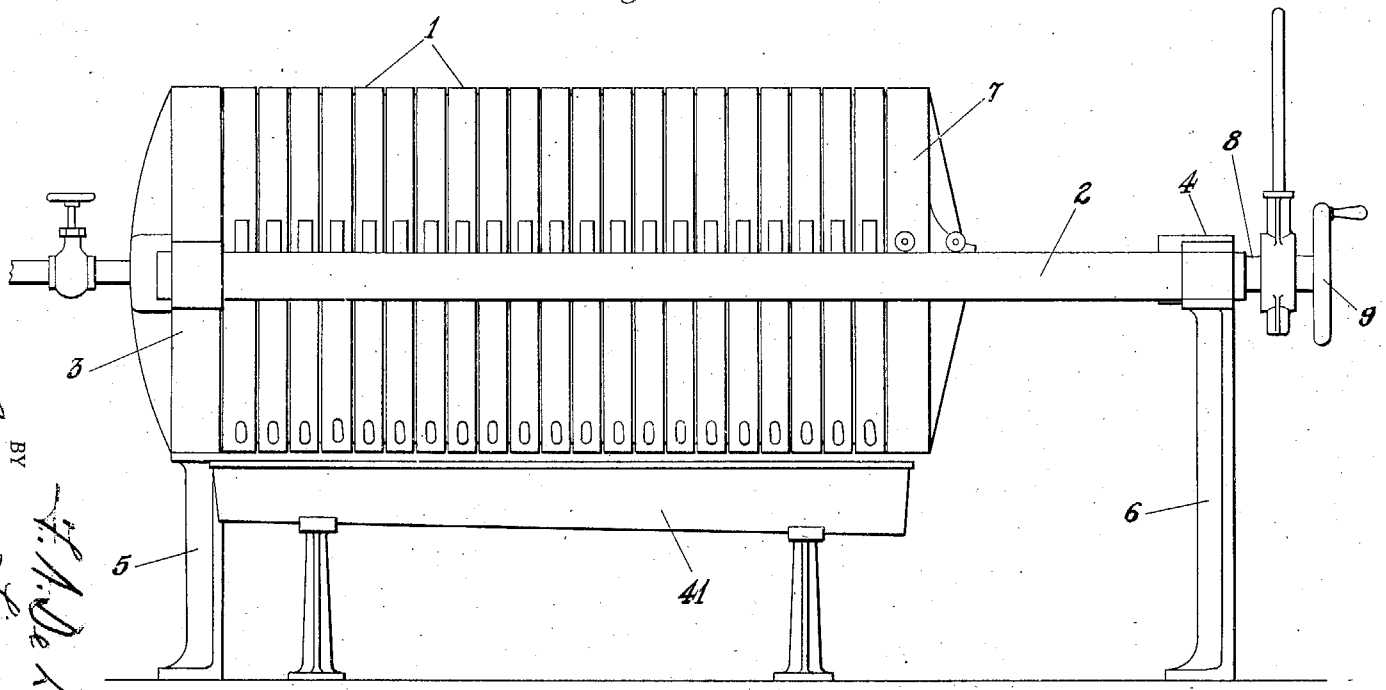
Fig. 1 is a side elevation, partly diagrammatic of a filter press embodying the invention.

A primary object of the invention is to provide a novel method and means for increasing the scope, speed, efficiency and economy of the operating cycle in the filtering system. The invention is applicable to the type of filtration commonly performed in filter presses, wherein the fluid to be filtered is forced through filtering media arranged in a battery, the retained solids forming as cake on the media while the filtered fluid or filtrate is discharged from the filter press. One object of the invention is to avoid the delay, expense and material loss now caused by separately and sequentially cleaning the filter cake from each separate filter medium or cloth and the adjoining plates during the opening or unloading of the filter press. By the invention, all the filter media and the cake or solid material restrained thereby may be removed immediately from the filter press and bodily transported to a remote point for separation of the cake and cleaning of the cloth. In the meantime the filter press may be as quickly supplied with fresh filter media and reformed and put into operation with a minimum of delay and interruption of the filtering operation. This feature of the invention saves a great amount of time, increases the cleanliness and efficiency of the filter press loading and unloading operations, avoids wear and destruction of the cloth and also permits the discharge of the cake and the cleaning of the cloth to be handled in an entirely separate department where the most efficient cleaning and discharging methods and means may be employed.

In connection with the discharging of the filter cake and the cleaning of the cloth or other filter media, the invention provides certain novel steps and operations. The filter cloth is most effectively separated from its adherent filter cake and cleansed for reuse in the filter press in a rapid and highly effective manner. This entails as one object of the invention the construction of filter cloth in a novel form specially designed to permit bodily removal from the press and subjection to a novel form of cake removal, washing and drying. If pre-wetting of the cloth is desired, the invention also facilitates that operation. These latter steps are preferably performed by means which enable the charged filter cloth to be successively brushed or scraped, then washed or sluiced with a washing fluid and then quickly dried, all without separate handling of the cloth. Preferably the filter cloth is mounted on a rotary device which permits their operations to be carried out at successively increasing rotational speeds and whereby centrifugal action is utilized as one of the active forces. For carrying out these steps, the invention provides a novel shape and form of filter cloth and a novel supporting frame therefor and also provides a novel mechanism for cooperating therewith during the brushing, washing and drying steps.

One form of the invention is further directed to providing for the bodily removal of filter cake from the press and separation thereof bodily from the filter cloth as an integral cake retaining the shape and consistency it acquired in the press. This feature of the invention enables the cake to be dried, baked or otherwise handled as required in various arts, all without breakage, crumbling or separate handling or reshaping.

Another object of the invention is to provide an improved filtering action in the filter press itself by increasing the efficiency and effectiveness of flow of the fluid through the press. Thereby increased capacity and improved filtering action are realized. This aspect of the invention entails a novel form of filter press plate, having a novel grid arrangement which permits the use of large and efficiently located fluid ports to reduce the danger of flow blockage. Such grid also induces high flowage capacity by providing a novel and effective filtrate discharge and thereby conduces to the rapidity and completeness of the filtering action. The construction of the filter plate of my invention is such that flowage of the fluid thereinto and therethrough is induced to take place in the most natural directions so that clogging and blinding of the plate and cloth are overcome and a large capacity attained. Due also to the novel construction of the plate the drainage grids thereof may be varied as to their capacity and flow-inducing qualities to permit the same filter press mechanism to handle a very wide range of different fluids, both liquid and gaseous. Moreover the novel grid construction of my filter plate makes for an exceedingly simple, sturdy, compact and inexpensive device which is easily cleanable, readily replaceable in whole or in part and is unaffected by whatsoever chemicals may be used in the filtering operation.

The invention further provides numerous minor but important improvements in the mechanical construction of the filter press which conduce to greater efficiency in sealing against leakage and preventing wear or destruction of the cloth and other elements of the mechanism while at the same time improving the speed and simplicity of all the operations. By virtue of the improved sealing means the invention also permits the use of higher pressures in the filter press.

Referring now broadly to the improved method and means for permitting bodily removal of the filter media and cake and separation and cleaning thereof at a point remote from the press, the filter cloth or other media is preferably formed as a tapered or frustro-conical sleeve having both ends open. Said sleeve is normally stretched over and held in the filter press by a supporting frame or rack which is likewise tapered to conform to the sleeve. The tapered rack and sleeve are mounted in the press between the faces of the two filter plates and suitable ports are provided in the rack whereby the liquor to be filtered is caused to flow into the interior of the sleeve and outwardly therethrough onto the contiguous faces of the plates and therethrough to discharge in the usual manner. The filter cake will thus form on the interior surface of the tapered sleeve which retains all the cake within it. When the filtering of a predetermined batch of raw liquor has been completed, the press is opened and all the individual sleeves with their interior supporting racks are bodily lifted from the press and carried to a remote point for cleaning. Then the individual sleeves may be readily removed from their supporting racks by peeling them and their adherent cake inside out off the rack frame. The conical sleeve with the filter cake now on its outer surface is then placed over a truncated, conical, perforate form on the rotary spindle of a device similar in general construction to a centrifugal machine having a stationary external casing. The sleeve is then rotated in successive three stages, the first very slowly to permit brushing or scraping of all the adherent cake; then washing fluid is forced outwardly from the interior of the spindle and form to cleanse the sleeve of all adherent cake particles, this preferably being done at a higher rotary speed to utilize a measure of centrifugal force. Then as a third step, the sleeve on the spindle is rotated at a relatively very high speed to dry it centrifugally.

In one modified form of the invention, special means are provided for catching and drying all particles of cake which may be dislodged from the cloth during the washing and/or drying operations. This is particularly important when the filter cake is the valuable ingredient, as in the drug and dye industries, for example.

The present preferred form of filtering plate comprises, as stated above, a grid made up of alternately arranged vertical strips of rigid material. Said parallel strips are shaped with one edge vertical and the other inclined so as to form a composite vertical face on either side of the plate with flowage or drainage spaces or channels between the alternate strips. Said drainage channels increase in depth or capacity from substantially nothing at the top of the grid to a discharge space substantially equal to the thickness of the entire grid at the bottom. This arrangement permits the liquor to flow very rapidly to discharge without danger of clogging or impedance, while providing a very strong, rigid and simple plate construction which, moreover, can be very readily varied as to the capacity and gradient of its drainage channels by simply substituting a differently tapered set of grid strips. Furthermore, this construction permits the use of strips of "Bakelite" or other similar rigid natural material or combinations of other materials of low cost and high strength and immunity to chemical attack.

By virtue of the novel shape and arrangement of the filter cloth sleeves and their supporting frames and due also to the construction of the plates and separate gasket or sealing means, the necessity is avoided for providing feed flowage openings in the filter cloth itself. This also avoids the careful alinement of cloths and frames heretofore necessary in order to provide a continuous channel or conduits commonly formed in filter presses by the juxtaposition of the flowage holes in the cloths and plates. Thus the interruptions of flow and the blinding or partial obstructions of flowage channels is prevented and wear and tear on filter cloths is diminished. By having separate gaskets using the same filter media material as the sealing means, even compression factors and a balanced pressure may be obtained within the press.

Other novel features of the invention will be pointed out hereafter or will be obvious from the disclosure and context. It will be understood that the foregoing general description and the following detailed description as well are exemplary and explanatory of the invention, but are not restrictive thereof.

Referring now in detail to the present preferred embodiment of the invention illustrated by way of example in the accompanying drawings, a filter press adapted to use the invention is conventionally shown in Fig. 1. It will be clear that the invention is designed to accommodate itself to substantially any standard filter press construction so far as the supporting framework and the assembling and tightening devices are concerned. As shown the plate holding frames 1 are supported by any suitable means upon parallel side bars 2, said bars in turn being attached at one end to the filter press head 3 and at the opposite end to a conventional screw standard 4. The head is supported by head legs 5 and the screw standard by screw standard legs 6. A screw actuator follower 7 is connected with the screw shaft 8 and is designed to be forced against assembled plates of the press by rotation of the screw through the ratchet gear wheel 9. It will be understood that the above described construction is largely conventional and of itself constitutes no necessary part of the invention which is adapted to cooperate with substantially standard or known type of filter press.

Figure 5:
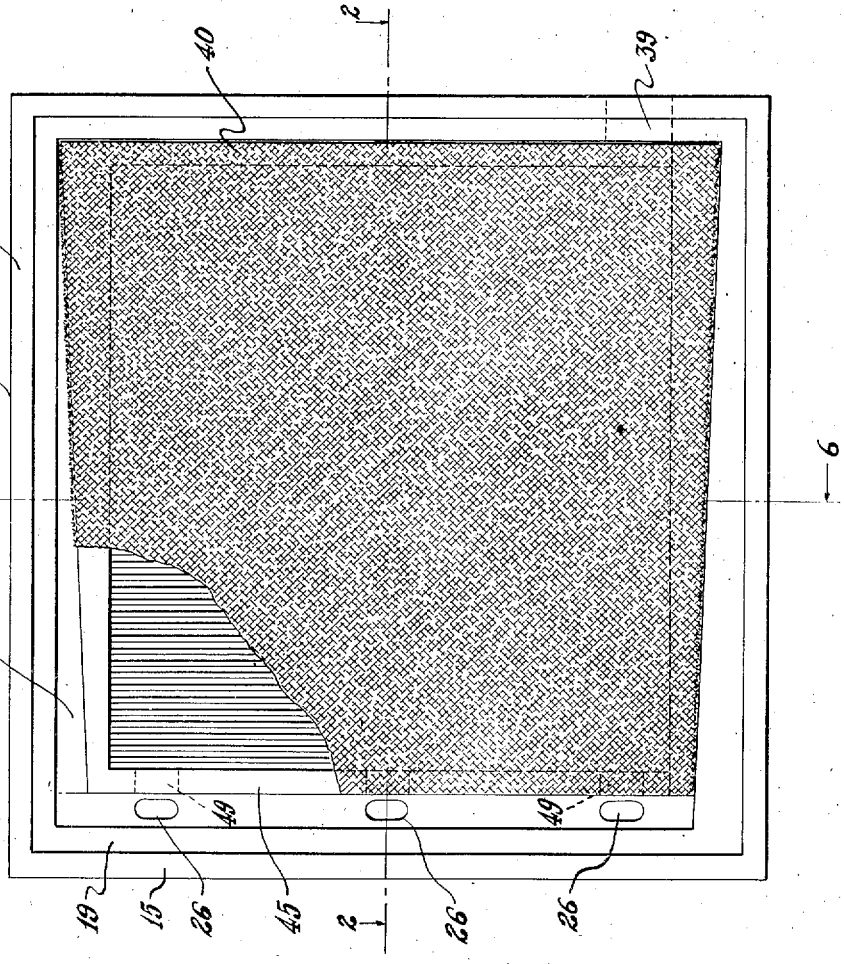
Fig. 5 is a vertical front elevation of a unit of the filter press with part of the filter medium broken to show the face of a plate grid.

Referring to Fig. 2, the plates which constitute the major working units of the mechanism in forming the assembled press comprise an external rectangular frome 1 of wood or other suitable material or combinations of materials. As shown in Fig. 5, said frame 1 may be made of a single solid, continuous or integral piece of material and such construction contributes to the leak-proof or sealing action of the press against leakage. Said frames 1 are adapted to be forced toward each other by the screw or hydraulic pressure of the filter press whereby the vertical edges 15 and the horizontal edges 16 (Fig. 5) are adapted to be parallel and contiguous to the corresponding edges of the adjoining plate. For sealing the contiguous edges of the frames 1 against the internal fluid pressure of the press, suitable packing or gasket sealing means are provided, which means of themselves are separate from and form no part of the filter cloth or other filter media hereinafter described. As shown in Figs. 2 and 3 the simplest form of sealing gasket comprises a rectangular frame 18 which is adapted to lie between the abutting edges of two contiguous plate frames 1. For this purpose the members 1 of the plate frames are grooved or rabbeted at 19 on the inner portion of the edge 15 whereby the gasket frame 18 occupies the groove formed by the opposed rabbets 19 of two adjoining plate frames 1. The opposite side faces of the gasket frame 18 are covered with a suitable sealing or packing material 20 which may conveniently be of the same stuff as is used for the filter medium. It will be clear that upon applying closing pressure to the plates 1 the edges 15 and 16 will be forced together and the gaskets 18—20 will form a tight seal entirely around the contiguous grooves 19 of the plate frames. Preferably the composite thickness of the gaskets 18—20 are slightly greater than the width of the groove formed by the adjoining rabbets 19 so that very heavy pressure may be applied to effect a tight seal.

A modified form of gasket for making an even tighter seal is shown in Fig. 4. Said gasket is T-shaped in cross section, the portion 21 being shaped to fit into the grooves 19, while the lateral flanges 22 overlap the inner corners of the frame to further seal against pressure of liquid within the press.

The portion of the plate frame 1 which supports and contains the filter plate proper comprises a rectangular portion 25 of reduced cross-section. The vertical face of said section 25 adjacent the feed side of the press is relatively wide and is provided with a plurality of ports 26 which are alined in the contiguous plate frames 1 so as to provide flowage ports and channels for the entering fluid to be filtered.

In accordance with the invention the filter plate proper is formed as a grid composed of a plurality of side-by-side vertical flat strips 30 and 31 (Fig. 7) which are mounted within the rectangular section or window 25 of the main frame 1 and when so mounted present a cross section equal to that of the frame 25. Said strips 30 and 31 are preferably formed of "Bakelite" or similar moulded plastic which is rigid, strong, inexpensive and substantially immune to chemical corrosion or attack. The flat side faces of the strips 30 and 31 are so mounted in the frame 25 as to be pressed or held closely together and immovable with respect to each other and the frame. If desired a transverse connecting and holding screw or rod may be provided (not shown) to join the strips and the frame together although ordinarily the close fit of the parts will be sufficient to maintain the desired alinement. Also if desired the strips may be held together and sealed by suitable adhesive such as "Bakelite" cement or varnish.

The shape and arrangement of the strips 30 and 31 to form the filter plate is such as to provide the maximum freedom of flowage of the filtrate after it has passed through the filter cloth or other filter medium and also to enhance the rapidity and efficiency of discharge of the filtrate from the press. The shape and arrangement of the grid-like plate is also adapted and designed to cause even deposition of filter cake on the filter cloth. In filter presses of the present type the tendency of the filter cake is to settle to the bottom and build up vertically so that the largest amount of cake will be found at the bottom of the press and a relatively thin amount thereof near the top. The flow-guiding and inducing qualities of my novel plate construction counteract this tendency and the filter cake forms evenly, uniformly and rapidly on the filter cloth.

With these ends in view the shape and arrangement of the grip strips 30 and 31 provide flowage channels of increasing depth and capacity from the top of the plate to the bottom, thereby overcoming the natural clogging effect due to the normal tendency of the filter cake to accumulate more rapidly at the bottom. By reference to Figs. 2, 6 and 7 it will be seen that the grid strips 30 and 31 are similarly shaped, but oppositely faced, with one edge 33 vertical and the opposite edge 34 inclined or tapered downwardly and toward the edge 33 so that the top of the strip is substantially wider than the bottom. By arranging contiguous strips to face in opposite directions, a composite grid or plate is formed having its exterior or cloth-contacting faces vertical but with alternately disposed channels 35 and 36 on the opposite faces of the plate. That is, each channel 35 is formed by the spaced faces of two members 30 and the inclined edge 34 of the intervening member 31 while similarly the opposite channels 36 are formed by the faces of members 31 and the inclined edges 34 of the members 30.

Figure 6:
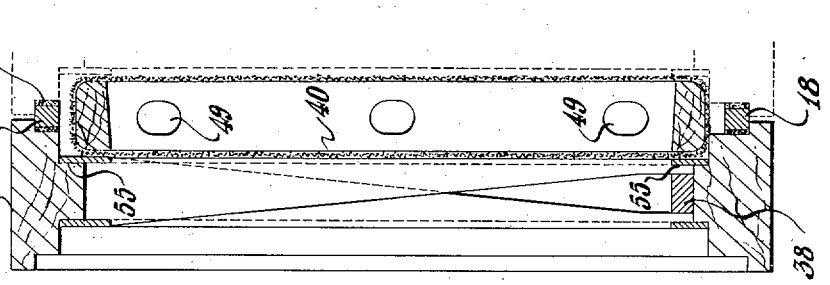
Fig. 6 is a transverse vertical section on line 6—6 of Fig. 5.

As will be clear from Figs. 6 and 7 the composite vertical plate faces formed by the spaced edges 33 of the strips are adapted to contact closely with the contiguous surfaces of the filter cloths or filter media 40, the construction and arrangement of which will be hereinafter described in detail. The downwardly increasing channels between the strips 30 and 31 thus commence with a minimum depth at the top of the plate or grid and increase downwardly at any desired gradient depending upon the slope of the edges 34 of the strips. In the lower portion of the grid it will be noted that the drainage channels intersect or communicate to form a relatively large tent-shaped drainage space 37 which is of increasing capacity downwardly. A spacing member 38 may be set between the feet of the strips and supported on the upper face of the lower plate frame member 1. Thus the lower portion of the filter plate or grid provides a drainage space of large capacity communicating with all of the drainage channels without constricting or deflecting the direction of drainage from a free downward path. At the same time the vertical edges 33 of the grid plate afford complete protection and support for the filter cloth throughout its height so that there is no tendency for the cloth to be pinched or crowded into the drainage channels at any point. It will be clear that any desired gradient of depth increase for the drainage channels may be provided merely by conformably varying the gradient of the inclined edges 34. Also the relative widths and number of drainage channels may be varied by strips of different thicknesses.

Any suitable means may be provided for discharging the filtrate from the drainage space 37. As shown a conventional side outlet 39 is provided at the bottom of the grid extending through the lower portion of the outer plate wall 1 to a suitable drainage petcock or other conventional drainage means, not shown, for discharge into a drainage pan 41 (Fig. 1). If desired a similar drainage outlet (not shown) may also be provided at the opposite side of the frame 1, or the filter press may be constructed with any suitable drainage channel communicating and extending the length of the press.

Referring now to the preferred form of the filter cloth or medium 40, same is made in the form of a continuous sleeve of frusto-conical shape having both ends open (Figs. 2, 5, 6 and 8). The dimensions of said sleeve are such that it will lie with its vertical faces in contact with the vertical faces of two adjoining plate grids, the ends of the sleeve preferably projecting slightly beyond the ends of the grids and contacting with the vertical faces of the grid frames 25. For supporting the sleeve 40 in said position, a supporting frame or rack is provided. Said rack comprises a feed-end vertical member 45 and an opposite vertical end member 46. A top rack member 47 and bottom rack member 48 are connected to the ends of the members 45 and 46 to form a rectangular interior outline. However, said top and bottom members are tapered or inclined on their upper and lower surfaces respectively so as to give the exterior outline of the rack a trapezoidal shape. That is, the rack exteriorly is tapered or of increasing height from its feed end 45 to its opposite end 46, thereby to conform to the interior dimensions of the sleeve 40 and thus stretch and maintain same in the desired tapered shape as shown in Figs. 5 and 8. Preferably the exterior edges of the rack pieces 47 and 48 are rounded to give a snug fit to the sleeve 40 without presenting any sharp edges thereto which might cut or weaken the cloth.

If desired the rack may be made demountable so that top and bottom members or wedge bars 47 and 48 of different tapers may be provided to thereby vary the stretch on the cloth or to permit the use of a somewhat smaller or larger sizes of cloth. This feature is also useful in cases where it may be desired to utilize a cloth with an inner lining or two cloths 40 may be used superposed with an intervening layer of filter-aid or some secondary filtering material such as fuller's earth, which may be spread on or held between the cloths. While the term "cloth" is here used as a generic name for a filter medium it will be understood that any other suitable filter media known to the art may be used for this element of the mechanism. For example, in lieu of cloth I may provide parchment, paper or skin, glass cloth, wire mesh, perforated metal or rubber, etc., and/or various combinations of these materials may be used as the filter medium, depending upon the particular process or material to which the filtering operation is applied. This principle may also be applied to the filtration of gases by providing a gas-absorbing medium between layers of cloth or the like.

As shown, the sleeve rack is of such length that its end 46 rests against the corresponding inner end of the main frame 1 and seated gasket frame 18, while the opposite or feed end 45 of the rack lies against the plate holder frame members 25 but short of the feed ports 26. A plurality of transverse feed ports 49 are formed in the rack member 45, said ports 49 being preferably at the same level as the longitudinal feed ports 26. Thus a feed liquor chamber 50 is provided between the walls 25 and the rack end 45, wherefrom the feed liquor under pressure enters the rack ports 49 and fills the space within the sleeve 40. Thence the feed liquor passes through the filter medium 40 and into the channels 35 and 36 in the plate grids, while the filter cake forms and is retained upon the interior surfaces of the sleeve.

While the present preferred form thereof is shown the sleeve rack and sleeve may be tapered in the opposite direction by suitable modifications in the cooperating devices in the filter press. Also, if desired, additional liquor flow ports may be formed in the end 46 of the rack.

Means are provided for tightly sealing and holding the assembled rack and sleeve 40 in position against the grid faces of walls 35 and 36, and for assuring tight sealing contact between the sleeve and the margins of the plate when the filter press is closed. For this purpose sealing or breaker strips 55, of "Bakelite" or like smooth, hard material are designed to be positioned to lie across the top and bottom ends of the grids and similar strips **55*a* border the vertical ends of the grid construction. The grid strips 30 and 31 are suitably notched at 56 and 57 on the tops and at 58 on their bottoms to receive and support said breaker strips 55 which extend clear across the grids of the plate and extend vertically a sufficient distance to cover the joints between the grid strips and the abutting surfaces of the frame members 25 and to join with the contiguous inner surfaces of the frame members 1. Preferably the members 25 are rabbeted for a short distance beyond the ends of the grid section proper to receive the ends of the breaker strips 55 whereby same may be seated flush with the faces of the grids throughout. The strips 55*a* are similarly rabbeted in the vertical members 25. The strips are attached to the frame 25 by countersunk screws or other suitable means. Thus the breaker strips provide a seal between the edges of the filter sleeve 40 and the grid frame and members during the filtering operation. The top and bottom strips 55 also serve to hold the vertical grid strips 30 and 31** in place but ready for prompt disassembly.

Figure 9:
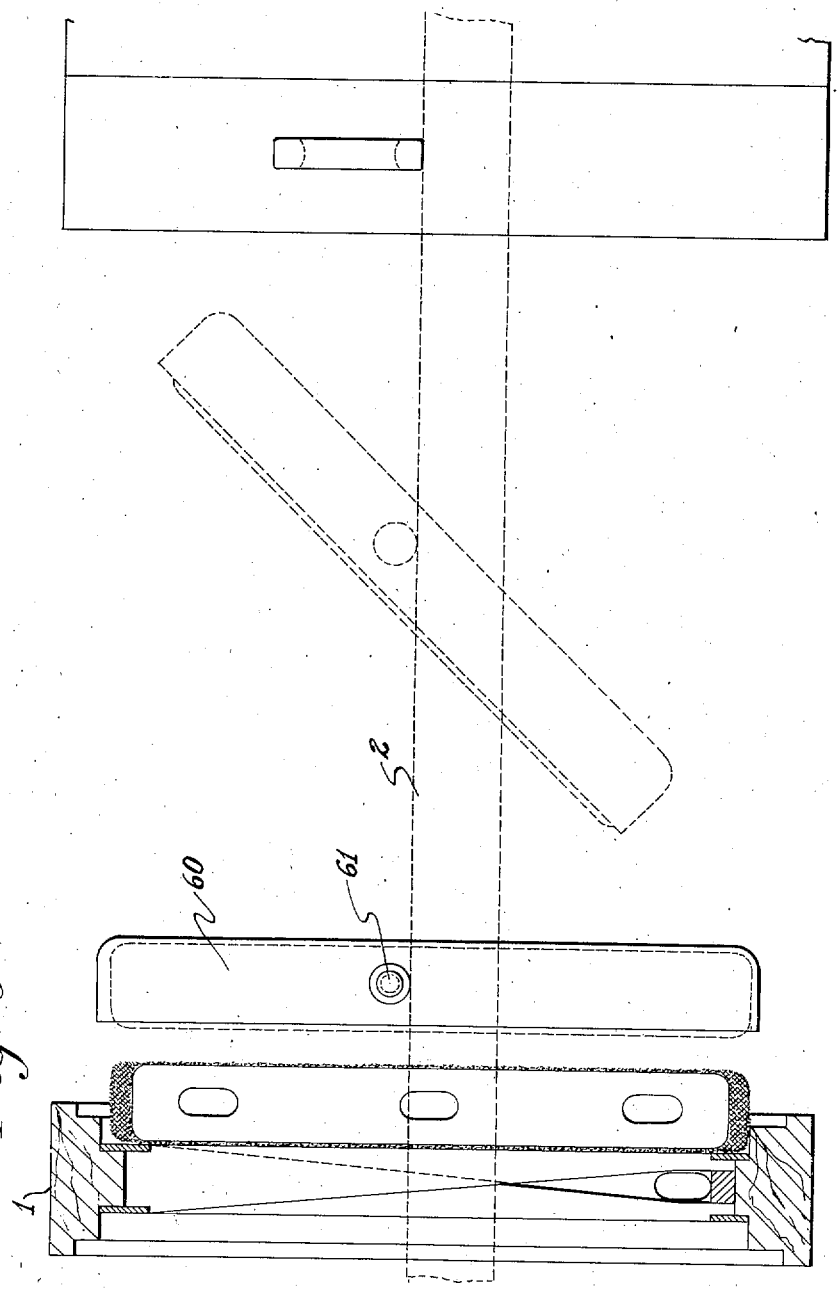
Fig. 9 is a transverse lateral section of a unit of the filter press showing means for removing a loaded sleeve.
Figure 10:
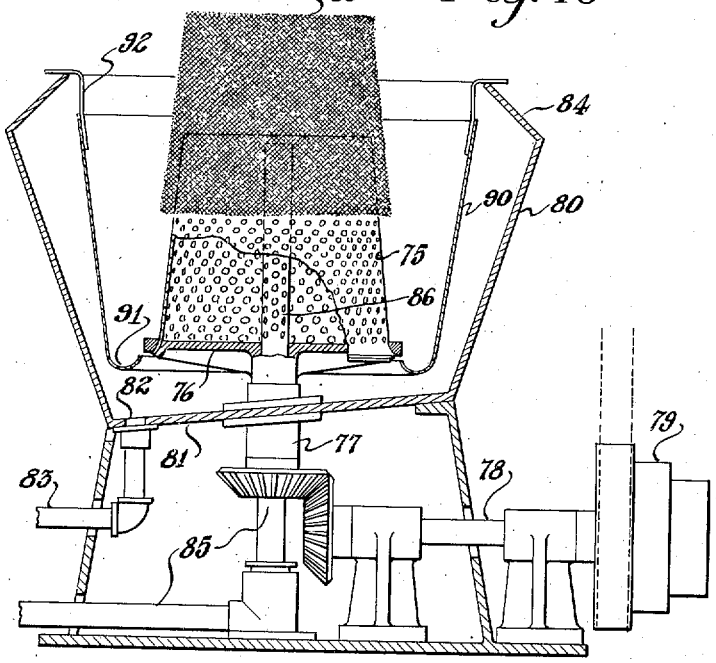
Fig. 10 is a central vertical section, with parts in elevation, of a centrifugal unit for scraping, washing and drying filter media.

An improved means and method for so removing the cake-charged sleeves is somewhat diagrammatically illustrated in Fig. 9. As shown, the cake-charged sleeve 40 with its interior rack or stretching frame has been exposed on one side by the opening of the press and the withdrawal of the adjoining plate frame 1. A sleeve-removing case or pan 60 is pivotally suspended for travel along the side bars 2 of the press by means of laterally extending trunnions 61. Said pan is thus adapted to be rolled along the side bars and moved to encompass and hold the projecting portion of the loaded sleeve 40. The pan with the loaded sleeve in it may then be withdrawn and if desired tilted to a horizontal position on the side bars (as indicated in the right hand portion of the drawings), whence it may be lifted into a suitable truck or other container for transport to the cleaning and drying department. It will be clear that by the use of said unloading pan the charged sleeve and its contents may be removed from the filter press expeditiously and without danger of dropping or spilling its contents, and may be transported as a unit for purposes of cleaning and drying.

Figure 11:
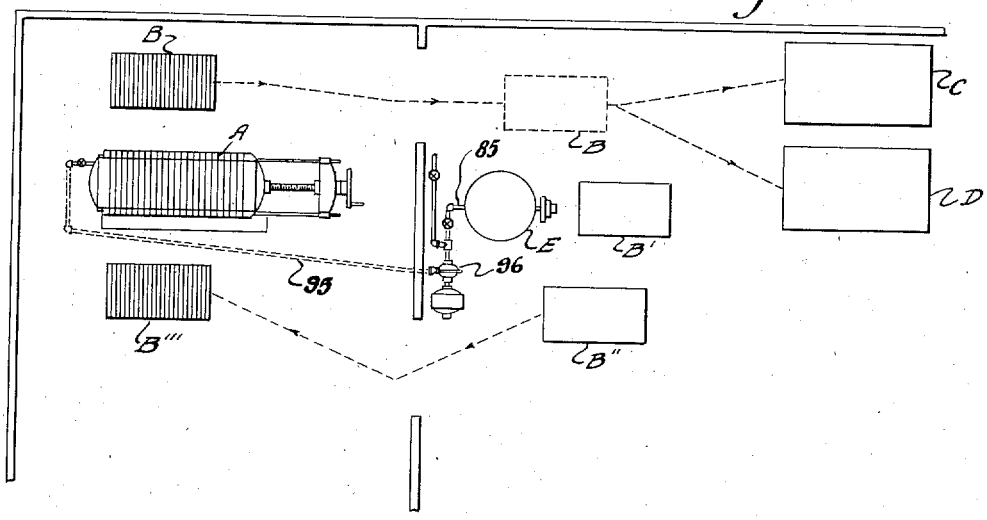
Fig. 11 is a diagrammatic plan view of a filtration plant embodying the invention.

Referring now to the novel steps and the means provided by the invention for removing the cake, cleaning and drying the sleeves, the general sequence and cycle of operations are diagrammatically shown in Fig. 11. The charged sleeves, removed from the filter press A as above described, are loaded onto a truck or other transporting device B and thereby removed to an unloading and sleeve-cleaning station. As the first step in removing cake from the loaded sleeve, the sleeve is turned inside out and peeled toward the small end of the tapered rack as shown in Fig. 8. During this operation, which can be very easily performed by hand because of the taper of the rack, a large part of the adherent cake will be dislodged from the sleeve and may be collected in a pan 70. This dislodged cake may be taken by the truck B or otherwise to a dryer station C or other disposal station D. In the meantime the inverted sleeves are taken to the machine E where they are brushed, washed and dried. The sleeve racks are carried by the truck B′, reassembled with the dried sleeves and returned via the route B″ to alongside the filter at B‴, where they are held in reserve for the next unloading of the press. As soon as cake-charged sleeves are removed from the press and loaded onto truck B, the press is resupplied with clean, empty sleeves and racks from a waiting truck B‴.

Referring now in detail to the novel method and means provided for brushing, washing and drying the inverted sleeves 40, same comprises a truncated, conical, perforate hollow form 75, the bottom end of which is seated on a solid plate 76 which is rotatably connected to a spindle shaft 77. Rotary movement is imparted thereto from a driven shaft 78 which is provided with a speed varying means conventionally shown at 79 and preferably having at least three driving speeds. The form 75 is of a shape and size to fit within the inverted sleeve 40 which in pratice is pulled down tightly over the form. A stationary casing 80 is built around the form 75, said casing having a bottom 81 sloping toward one side, the lowest portion thereof being provided with a drainage hole 82 which communicates with a drainage pipe 83. The casing is preferably flared upwardly and outwardly to the level of the top of the form 75 and thereabove has an inwardly and upwardly inclined guard lip 84. The spindle 77 is preferably hollow and is journaled about a vertical pipe 85 which extends upwardly through the center of the form 75 and is perforated at 86 above the plate 76 for the purpose of supplying and spraying washing fluid to the interior of the form.

Means for catching and retaining cake or solid matter removed from the sleeve 40 while it is on the form 75 comprises an open-bottomed receptacle 90 having substantially vertical or somewhat inwardly inclined side walls and a bottom lip 91 curved inwardly and upwardly to lie flush with the bottom edge of the form 75. Hangers or hooks 92 are provided for removably holding the receptacle 90 in the position shown.

The first stage of the operation performed on the above described machine may be defined as a brushing or scraping of the adherent cake from the exposed surface of the sleeve 40. During this stage form 75 is rotated preferably very slowly, while the cake is dislodged from the surface of the sleeve by holding a suitable scraper or brush thereagainst. Ordinarily this may be done manually, but if preferred, a suitable brush or scraper (not shown) may be mounted on the stationary casing and caused to bear against the surface of the sleeve. The removed solid matter will fall into the receptacle 90 and same may then be lifted out of the casing 80 and the cake conveyed to disposal as above described. In any case the scraping or brushing of the cloth is performed rapidly and without danger of tearing or stretching the cloth.

The second stage comprises the washing or flushing out of entrained solid matter from the inverted sleeve 40. For this purpose the form 75 is preferably but not necessarily rotated at a somewhat higher speed. Simultaneously the washing liquor is forced upwardly through the pipe 85 and sprayed out through the openings 86 and the perforations in the form 75 and into and through the sleeve 40. The force of the spray and the centrifugal action of the rotation combine to give a thorough sluicing and cleansing of the sleeve. In many instances the washing liquor may be the filtrate itself, as same frequently is most efficacious for washing filter cloth. The filtrate for washing may conveniently be supplied from the discharge of the filter press by a by-pass conduit 95 and a pump 96 communicating with the wash pipe 85. The drained wash liquor discharging from the pipe 83 may be pumped back to the feed liquor of the press for refiltering. In many cases, of course, some liquid other than the filtrate, such as water, will be used for the washing operation.

As a third stage the sleeve 40 is dried quickly and effectively by rotating form 75 at a relatively high speed whereby centrifugal action will quickly throw off all wash liquid remaining in the sleeve and same will drain out through pipe 83 as described. If desired for very rapid drying, hot air or other gas may be simultaneously forced through the pipe 85. When the sleeve has been dried it may then be removed from the form, turned right side out and replaced on one of the racks, ready for reuse in the filter press.

It will be understood that the various features of the invention here disclosed when taken and used in their entirety comprise a highly novel and efficient mechanism and filtering method. However, it is not essential that they all be used in conjunction. For example, the mechanism which comprises the parts of the filter press itself may be used with great effectiveness for small sewage disposal plants, in which case the filter cake will probably not be removed and the sleeves cleaned for reuse. For such purpose the sleeves and their racks may be made of relatively inexpensive material and can be burned or otherwise disposed of without material expense. Likewise it will be found that many of the advantages of the novel construction of filter plate grid may be incorporated very simply into filter presses of the standard plate and frame type without material change except for the substitution of the plate grid construction.

Figure 12:
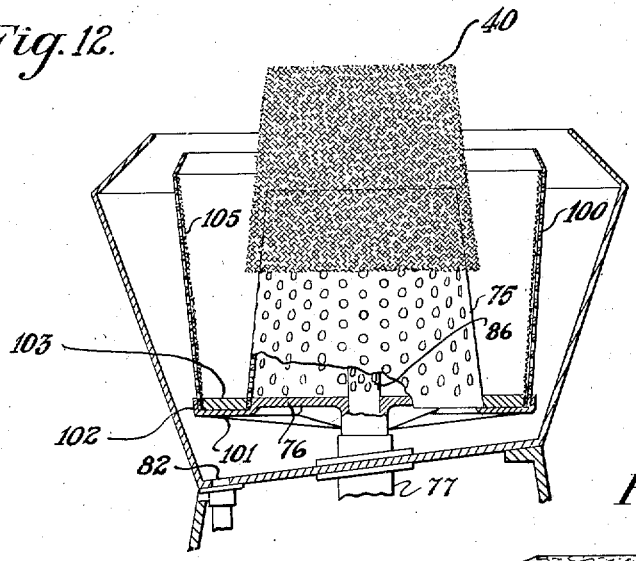
Fig. 12 is a fragmentary vertical section of a modified centrifugal device similar to that shown in Fig. 10.

In Fig. 12 is shown a modified centrifugal mechanism for washing and drying the filter cloth, particularly adapted for cases where the filter cake is of special value and all fragments thereof are to be saved. For this purpose a perforate centrifugal basket 100 is mounted to surround the form 75 and rotate therewith. The bottom edge of the basket 100 is seated at the periphery of an annular spider 101 which extends from below the bottom plate 76 of the form 75. The outer ends of the spider arms are upturned at 102 to receive and retain the bottom edge of the basket. Means for tightly gripping the basket against the rim 102 comprises a downwardly tapered annulus 103 which fits tightly between the bottom of the form 75 and the bottom of the basket 100, but permits ready removal of the latter when desired. The ring 103 also assists in holding down the sleeve 40 when same is fully seated on the form.

The inner surface of the basket 100 is preferably covered with a cylindrical liner 105 of filter cloth for the purpose of catching and retaining all particles of filter cake which are dislodged from the sleeve 40 in the process of washing and drying same. In operation the basket 100 and its liner 105 act to perform a secondary filtering step in recovering fragments of filter cake dislodged from the sleeve 40 during the washing and drying thereof. The centrifugal force applied during the washing and drying of the sleeve cause the washing fluid to be driven through the filter medium 105 and the perforations in the basket 100 so that any cake particles are retained by the liner 105. The liner may be used for this purpose during the washing and drying of a large number of sleeves 40 and, when it becomes loaded with filter cake, may itself be removed from the basket for the collection of the retained cake. This feature of the invention is of particular value when the cake is the valuable element, as in the drug and dye industries.

Figure 14:
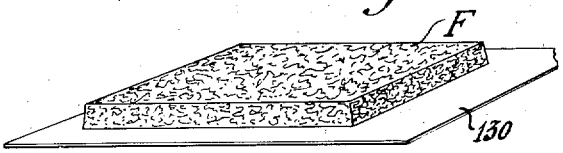
Fig. 14 is a perspective view of an integral filter cake on a drying tray.
Figure 13:
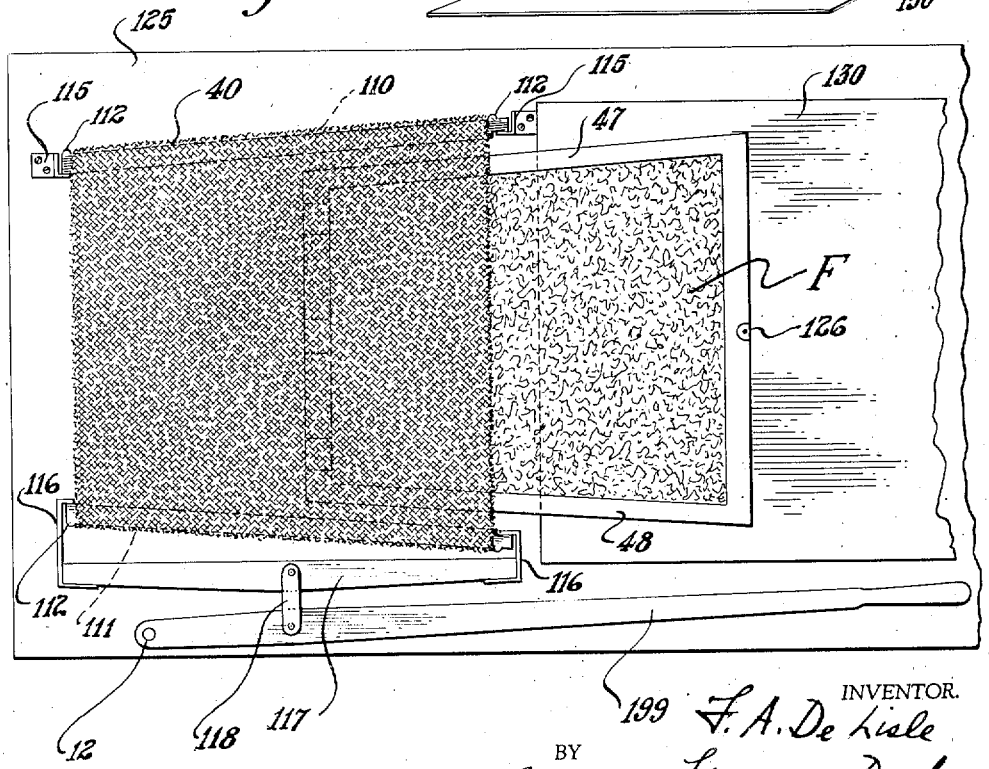
Fig. 13 is a top plan of a modified form of filter sleeve rack and method of removing filter cake therefrom.

Referring now to Figs. 13 and 14, there is shown a modified form of rack for supporting and stretching the tapered sleeve 40 of filter cloth. This modification is useful both in the setting up of the cloth on the rack prior to introduction of same into the press, and also in the removal of the filter cake as an integral block from the sleeve after filtering operation. As embodied, the sleeve 40 is adapted to be first shaped and opened up for reception of the tapered rack 47—48 by means of upper and lower sleeve-forming bars 110 and 111, respectively. Said bars have near either end and projecting from their outer curved surfaces lugs 112 which serve to engage and position the cloth 40 between them. In setting up the cloth with respect to the rack, the upper bar 110 is first inserted and the sleeve 40 allowed to hang from it. Then the lower bar 111 is inserted and stretched to separate the two bars and stretch the sleeve for the reception of the inner rack 47, 48. The ends of the bar 110 may be conveniently suspended or restrained by brackets 115, while the opposite bar 111 may be engaged by a suitable stretching bracket 116, the hooked ends of which may be formed on a pivotally mounted whiffle-tree device 117 which is connected by a pivoted link 118 to a stretching handle 119, the latter being pivotally mounted at 120. Thus this device forms a convenient means of pre-forming the sleeve for introduction and removal of the tapered rack 47—48. The latter will be introduced from the wider open end of the sleeve and seated to tightly stretch the sleeve by slightly forcing it thereinto against the sides of the bars 110 and 111.

The above-described construction also permits ready removal of the rack 47—48 from the sleeve after the filtering operation. Furthermore, in accordance with the invention, the filter cake F is adapted by such means to be removed as an integral block from the filter sleeve 40. As shown in Fig. 13, the loaded filter sleeve 40 may be conveniently laid on a table surface 125 and the rack 47—48 withdrawn. The sleeve may be conveniently held in place by the bars 110 and 111 and the restraining brackets, such as 115 and 116. The rack 47—48 will then be withdrawn, as by a hook attached to the eyelet 126 which pulls the rack and the filter cake F within it onto a flat receiving tray 130. The rack may then be lifted away from the cake F so as to leave same as an integral block lying on the tray (Fig. 14). For easy separation the inner faces of the rack may be slightly beveled as indicated by the shape of the block F in Fig. 14.

The filter cake F lying on the tray 130 may be conveniently carried to and used in suitable drying or baking ovens or for any other purpose in which filter cake may be conveniently handled in such form. This feature of the invention is of particular value in arts such as the manufacture of dye stuffs. For example in making synthetic indigo it is customary to scrape the fragments of filter cake from the cloths and then charge them into drying pans where they may be baked. The present invention makes it possible to eliminate many steps in the handling of the cake and the pre-forming thereof into special shapes and containers for drying, baking and similar operations. Also it will be clear that the cake blocks F retain the exact consistency of the material as it comes from the filter press and its porosity and structural formation attained in the press is not disturbed thereafter.

The invention in its broader aspects is not limited to the specific mechanisms shown and described but departures may be made therefrom within the scope of the accompanying claims without departing from the principles of the invention and without sacrificing its chief advantages.

What I claim is:

1. In the art of filtering fluids the steps of forcing raw fluid under pressure through a filtering medium in a filter press to form a cake thereon, removing the medium and its adherent cake from the press, and then rotating said medium while scraping the surface thereof to remove cake therefrom.

2. In the art of filtering fluids the steps of forcing raw fluid under pressure through a filtering medium in a filter press to form a cake thereon, removing the medium and its adherent cake from the press, dislodging adherent cake from the medium, washing the medium and then rotating it to dry it centrifugally.

3. In the art of filtering fluids the steps of forcing raw fluid under pressure through a filtering medium in a filter press to form a cake thereon, removing the medium and its adherent cake from the press, supporting the medium on a rotating support and scraping the adherent cake from the exposed surface thereof, rotating the support at a higher speed while passing washing fluid through the medium and then rotating the support at a still higher speed to dry it centrifugally.

4. In the art of filtering fluids the steps of forcing raw fluid under pressure through the inner surface of a sleeve-shaped filtering medium in a filter press to form a cake thereon, removing the medium and its adherent cake from the press, turning said sleeve-shaped medium inside out to expose adherent cake on the interior thereof, and rotating said inverted medium while scraping the surface thereof, washing it and drying it.

5. In a filter press a drainage plate for supporting a filter medium, said plate having a filter medium contacting and drainage member comprising a plurality of vertically disposed relatively thin flat strips disposed with their flat paralled faces in contact, the edges of every other strip being vertical and arranged to lie in a common vertical plane for supporting the filter medium and the upstanding edges of the intermediate strips being inclined downwardly and away from said plane to provide drainage channels of increasing cross section downwardly of the plate.

6. In a filter-press drainage plate a plurality of flat strips having one longitudinal edge vertical and the opposite edge inclined to give the strip a generally trapezoidal outline, said trips being disposed with their flat parallel faces in contact and arranged alternately so that the vertical edge of every other strip lies in the same vertical plane for supporting a filter medium and the inclined edges of the intermediate strips slope downwardly and away from said plane, thereby to form two opposite filter-medium contacting vertical faces having drainage channels of increasing cross section downwardly.

7. In a filter-press drainage plate a plurality of flat strips having one longitudinal edge vertical and the opposite edge inclined to give the strip a generally trapezoidal outline, said strips being arranged alternately so that the vertical edge of every other strip lies in the same vertical plane and the inclined edges of the intermediate strips slope downwardly and inwardly from said plane, thereby to form two opposite filter-cloth contacting vertical faces having drainage channels of increasing depth downwardly and a space near the bottom of the plate between the vertical faces where said drainage channels merge to form a relatively capacious drainage space interiorly of the plate.

8. In a filter-press in combination a filter cloth formed as a continuous sleeve open at both ends, a rack for interiorly supporting the sleeve to hold same in filtering position between plates in a filter-press and means for presenting fluid to be filtered to the interior of the sleeve while same is supported on the rack, the sleeve tapering in interior cross section from one end toward the other and the rack tapering conformably therewithin to permit ready insertion and withdrawal of the rack, means for holding the rack and sleeve between filter-drainage plates to effect the filtration and means for sealing the escape of fluid from about the periphery of the rack.

9. In the art of filtration the steps of forming a filter cake upon and against the surface of a filter cloth in a filter press, removing the cloth and the cake therewith from the press and then removing the cake as an integral block from the filter cloth.

10. A filter press drainage plate, comprising a border having top, bottom and side members, a fluid inlet adjacent the top of the plate, means extending between said top and bottom border members, forming filtrate drainage channels which increase in cross-sectional area from the top toward the bottom of the drainage plate, said channel forming means also serving to support a filter medium, and drainage means in the bottom portion of the plate, on the drainage side of the filter medium, in communication with said drainage filtrate channels, for receiving filtrate therefrom.

11. A filter press drainage plate, comprising a border having top, bottom and side members, a fluid inlet adjacent the top of the plate, means extending between said top and bottom border members, forming filtrate drainage channels on both sides of the drainage plate, said drainage channels increasing in cross-sectional area from the top toward the bottom of the drainage plate, said channel-forming means serving also to support a filter medium, and drainage means in the bottom portion of the plate on the drainage side of the filter medium, in communication with both sets of filtrate drainage channels, for receiving filtrate therefrom.

12. A filter press drainage plate, comprising a border having top, bottom and side members, a fluid inlet adjacent the top of the plate, a plurality of downwardly tapered members extending between the top and bottom border members, in side by side relationship such as to form filtrate drainage channels which increase in cross-sectional area from the top to the bottom of the plate, said channel-forming members being separable and also providing support for a filter medium, and a common drainage means adjacent the bottom of the drainage plate in communication with the filtrate drainage channels, for receiving filtrate therefrom.

13. A filter press drainage plate comprising a closed border having ends and sides, a fluid inlet adjacent one of said ends, means extending between said end border members, forming filtrate drainage channels which increase in cross-sectional area from the fluid inlet end of said plate border toward the opposite end of the drainage plate, said channel means also serving to support a filter medium and drainage means in said opposite end portion of the plate, on the drainage side of the filter medium, in communication with said drainage filtrate channels for receiving filtrate therefrom.

FRANCIS A. DE LISLE.